W. B. PHINNEY.
BEAN SNIPPING MACHINE.
APPLICATION FILED APR. 26, 1909. RENEWED MAR. 7, 1913.

1,062,663.

Patented May 27, 1913.

W. B. PHINNEY.
BEAN SNIPPING MACHINE.
APPLICATION FILED APR. 26, 1909. RENEWED MAR. 7, 1913.

1,062,663.

Patented May 27, 1913.

W. B. PHINNEY.
BEAN SNIPPING MACHINE.
APPLICATION FILED APR. 26, 1909. RENEWED MAR. 7, 1913.

1,062,663.

Patented May 27, 1913.

UNITED STATES PATENT OFFICE.

WILLIAM B. PHINNEY, OF CHILLICOTHE, OHIO, ASSIGNOR TO THE PHINNEY ENGINEERING COMPANY, OF CHILLICOTHE, OHIO, A CORPORATION OF OHIO.

BEAN-SNIPPING MACHINE.

1,062,663.      Specification of Letters Patent.      Patented May 27, 1913.

Application filed April 26, 1909, Serial No. 492,373. Renewed March 7, 1913. Serial No. 752,785.

*To all whom it may concern:*

Be it known that I, WILLIAM B. PHINNEY, a citizen of the United States, residing at Chillicothe, in the county of Ross and State of Ohio, have invented certain new and useful Improvements in Bean-Snipping Machines, of which the following is a specification.

My invention relates to the improvement of bean snipping machines of that class which are particularly designed to operate upon string beans.

The objects of my invention are to provide a machine of this class of superior construction and arrangement of parts, wherein improved means are provided for automatically severing the ends of string bean pods; to so construct my improved machine as to admit of the same being operated rapidly and effectively; to provide in conjunction with said machine improved means for regulating the lengths of the tips severed; to provide means for automatically discharging from the machine, string bean pods of such unusual or irregular form, as to prevent the proper operation of the tip severing mechanism; to provide improved means for feeding the beans into the machine and properly discharging the same into the various compartments thereof and to produce other improvements the details of which will be more fully pointed out hereinafter. These objects I accomplish in the manner illustrated in the accompanying drawings, in which:

Fig. 5 is a side elevation of a portion of the machine with parts of the supporting frame removed, showing a longitudinal section of the hopper and feeding mechanism, Fig. 5^A is an enlarged section on line $x$—$x$ of Fig. 5.

Similar numerals refer to similar parts throughout the several views.

Figure 3:
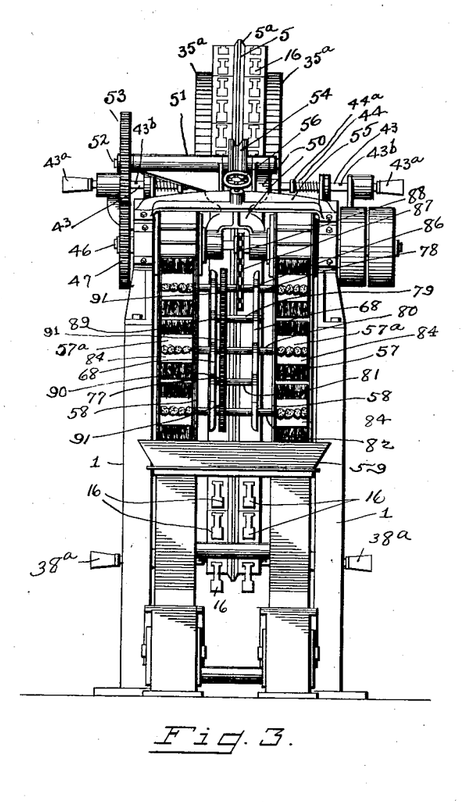
Fig. 3 is an end view thereof.
Figure 4:
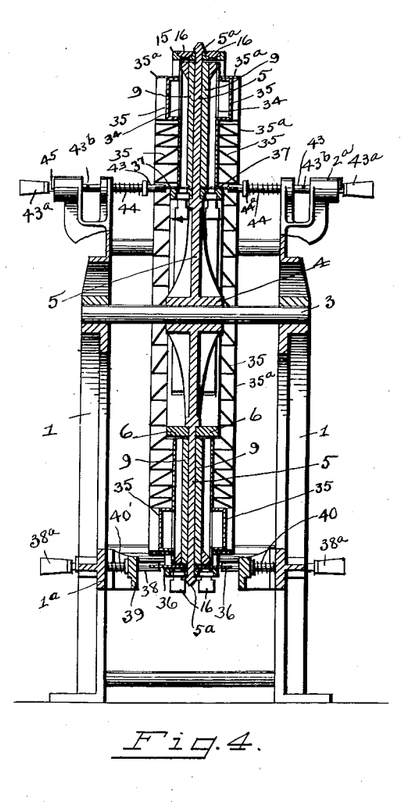
Fig. 4 is a central vertical section on line $x$—$x$ of Fig. 1.
Figure 8:
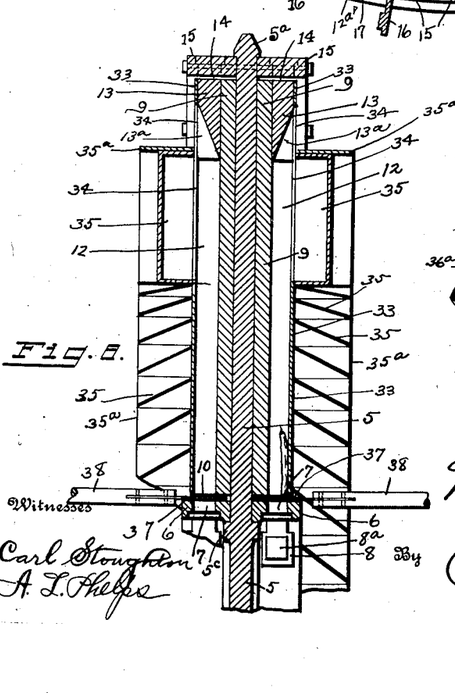
Fig. 8 is a sectional view at right angles with that shown in Fig. 7, through the upper half of the machine body.

In carrying out my invention, I provide a supporting framework, which comprises two opposing and preferably arched or yoke-shaped standards 1, from the upper side of each of which extend laterally diverging frame arms 2, the frame arms of one of the standards 1 being connected at their extremities with the corresponding arms of the opposing standard in the manner hereinafter described. Journaled in boxings provided on the upper sides of the arched standards 1, are the end portions of a transverse shaft 3 upon the central portion of which is carried the central hub member 4, of a comparatively large disk 5, this disk being formed with a peripheral rim of the substantially V-form shown at 5^a in Figs. 3, 4 and 8 of the drawing. The central portion of the disk on each side, is arranged with radially arranged strengthening ribs 5^b, which at their outer ends join a circular rib 5^c.

Secured to each of the outer faces of the disk and on the outer side of the circular rib 5^c thereof, is a ring or band 6, through which are formed at equidistant points, radially arranged openings 7, these openings adapted to be closed by closure plates or valves 8 which are pivotally connected with the inner side of the ring or band 6 adjacent to each of said openings, each of said closure plates having formed on one face thereof a projecting portion 8^a adapted to enter the discharge end of the adjacent opening. On each side of the disk 5, I provide a circular facing, comprising radially arranged wooden sections 9, the curved inner ends of which form a circular shoulder 9^a between which and the periphery of the ring or band 6, is formed a circular recess 10. The wooden plate or facing segments 9, have their outer rounded extremities at a short distance from the base of the V-shaped disk edge 5^a. Secured radially on the outer surface of each of the facings formed by the wood segments 9, are outwardly projecting ribs 11, said ribs being arranged at equidistant points and formation on each side of the central disk 5 of radial pockets or compartments 12, the inner ends of which converge and are further reduced in width by the lateral enlargement of one side of the inner end portion of each of the ribs 11, this enlargement being so affected as to form a curved shoulder 11ª.

To the facing formed by the wood members 9, I secure in the outer end of each of the pockets 12 a block 13, which extends laterally from one of the ribs 11 to a point a short distance from the remaining rib of the pocket, resulting in the formation of a comparatively narrow passage or chute 12ª between said block and the adjacent rib. Each of the blocks 13 has an inclined channel formed in its outer face, as shown at 13ª. On the outer side of the shoulder produced by the outer ends of the wood segments 9 and at such distance therefrom as to leave a circular recess 14, I secure to each face of the disk 5 a plurality of successively arranged curved segments 15, in the outer side of each of which are pivoted the corresponding ends of two or more closure plates 16, the remaining end portions of which are formed on their inner faces with projections 16ª which are adapted when said plates are closed inwardly against the segments, to enter and close radially arranged openings 17 formed through said segments and opposite the passages 12ª.

Figure 1:
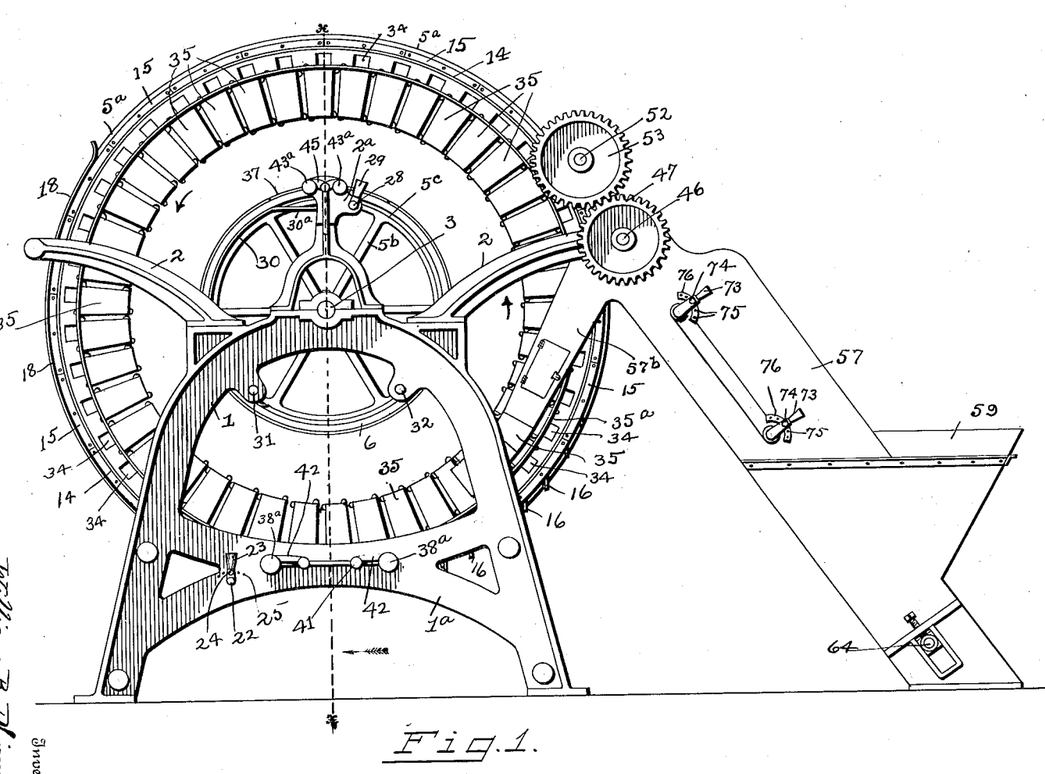
Figure 1 is a view in elevation of my improved machine.
Figure 6:
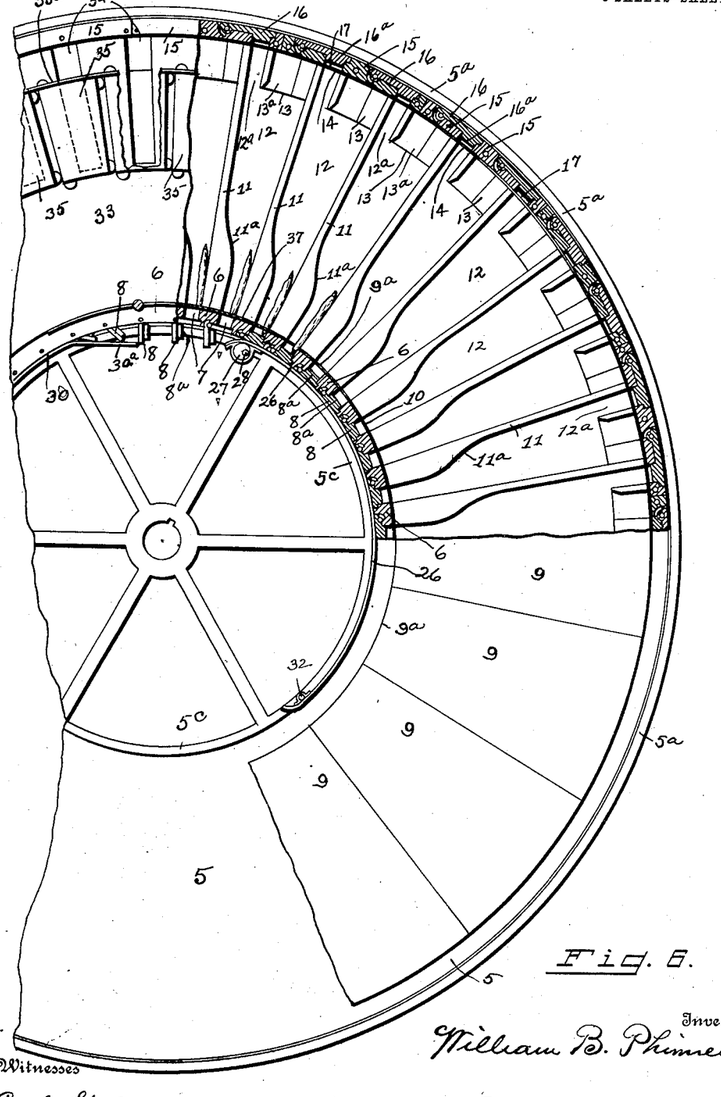
Fig. 6 is an enlarged view partly in section and partly in elevation of a portion of the main body of my machine, showing for the sake of clearness in illustration, certain elements of said body removed.
Figure 7:
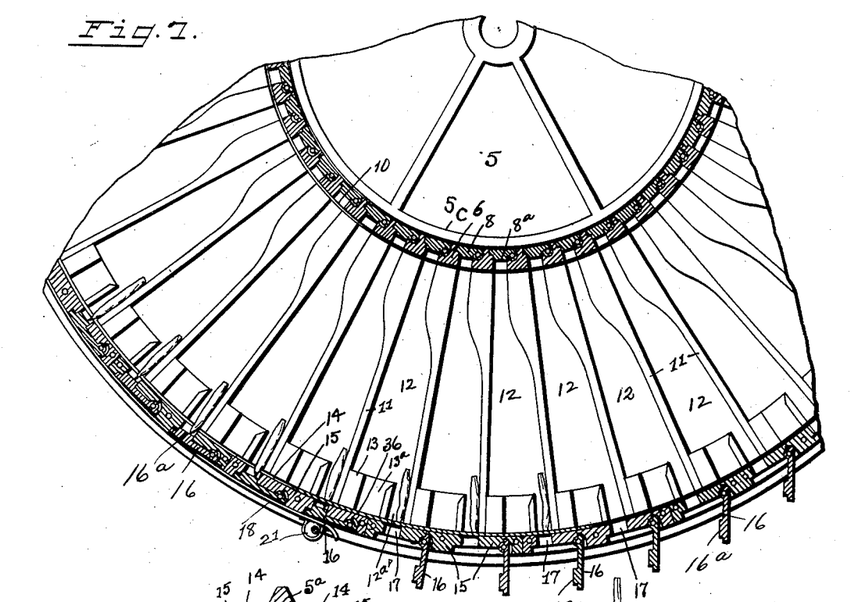
Fig. 7 is a detail view partly in section and partly in elevation, showing the lower portion of the main machine body or wall.

18 represents two spring or guard strips, one of which is provided on each side of the peripheral rim 5ª of the disk 5 and as indicated in Fig. 1 of the drawing, each of these guard strips has its upper outwardly bent terminal at a point above the center of the height of the machine, from which point said guard strip extends downward following the curvature of the outer surfaces of the segments 16 and being connected by means of clips 19 (see Fig. 2) with a transverse frame rod 20, which connects the extremities of one pair of the frame arms 2. The lower end of each of the strips 18, has, as is shown in Fig. 7 of the drawing, its termination at a point a short distance from a line drawn vertically through the center of the disk 5, said lower strip terminals being bent outward or downward, as shown. As will be understood, the strips 18 serve at all times to hold a certain number of the external closure plates in closed positions and in order to regulate the degree of closure of said closure plates, I provide beneath each of said strips, a cam body 21 (see Fig. 1). This cam body is carried eccentrically on a short shaft 22, which is journaled in a cross member 1ª of the adjoining frame standard 1. The outer end portion of the shaft 22, is provided with a handle 23, which projects from said shaft and which is designed to be set and retained at a desired angle by the insertion of a pin 24 through an opening in said handle, said pin being adapted to engage the desired one of a plurality of pin holes 25 formed in said frame member 1ª. I also provide a curved spring or guard strip 26 which is of such length as to contact with the inner sides of a certain number of the closure plates 8 and tend to hold the latter in closed positions. This strip 26 has one end in bearing contact with the periphery of a cam body 27, with which is eccentrically connected a rod 28 which leads outward to and through an upwardly extending bracket 2ª, with which each of the frame standards 1 is provided. This rod or short shaft 28 is preferably provided with a handle 29, by means of which the rod may be turned to produce a greater or less degree of pressure of the cam 27 against the inner face of the upper end portion of the strip 26 and thereby regulate the degree of closure of those closure plates or valves which are in contact with said strip. The strip 26 is located, as shown, above and to the right of the center of the disk body and I provide to the left of the center thereof, a curved strip 30, which has its upper end portion provided with a short horizontal extension 30ª which lies in the path of the depending open closure plates 8. The lower end of the strip 30 following the curvature of the frame rib 5ᶜ, is connected with a rigid frame pin 31, while the lower end of the strip 26 is similarly connected with a transverse frame pin 32, (see Figs. 1 and 6). The ribs 11 and pockets 12 on each side of the central disk, are covered by a circular metallic plate 33 and each of these plates has formed in its outer portion radially arranged slotted openings 34.

On the inner side of the outer circular row of each of the plates 33 and at a distance therefrom, I secure to said plate 33, a circular row of radially arranged outwardly projecting inclined cups 35, the mouths of which open in the same directions. It will be observed by reference to Fig. 5 of the drawing, that one of these cups is provided over the greater portion of each of the plate openings 34, said opening thus providing a communication between the cup and the corresponding pocket 12. It will be observed that the cups 35 of the circular row, are arranged radially and at a slight distance one from the other and that the outer ends of said cups as well as the entrances to the spaces between the cups, are covered by a circular band 35ª.

For the purposes hereinafter set forth, I employ on each side of the machine, two cutting blades which are designed to sever the flower and stem ends from the bean pods.

Figure 9:
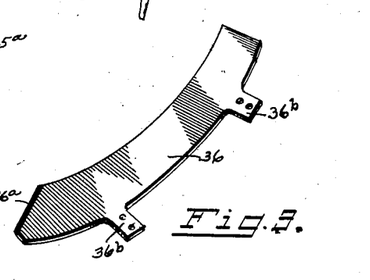
Fig. 9 is a detail view in perspective of one of the cutting blades which I employ in the manner hereinafter described.

Each of these cutting blades is of the curved or segmental form indicated at 36 in Fig. 9 of the drawing. For the sake of distinguishing, however, between the upper and lower blades on each side of the machine, I have indicated the upper blades which correspond with said lower blades in form, by the numeral 37. In the construction of this cutting blade, one end thereof is beveled and sharpened to provide a cutting edge 36ª and the outer curved edge of the blade has projecting therefrom two separated lugs 36ᵇ. One of these blades is removably inserted in each of the circular spaces or recesses 14 heretofore referred to as existing between the segments 15 and the outer ends of the wood sections 9 and ribs 11. This insertion of the blade occurs in the lower side of said circular recess, the cutting end of the blade as 36ª, being brought in shearing engagement with the mouths of the passages 12ª of the pockets 12. Connected with the outwardly projecting lugs 36ᵇ of the lower blade 36, are the inner ends of outwardly extending supporting rods 38, which pass through openings in frame brackets 39 which are on the inner sides of the frame members 1ª and which also pass through said frame member and are provided on their outer ends with an enlarged head or handle 38ª. The blades which are thus supported are normally pressed inward to the faces of the disk 5, through the medium of coiled springs 40 which are mounted on said rods 38 between the brackets 39 and the frame members 1ª.

Figure 2:
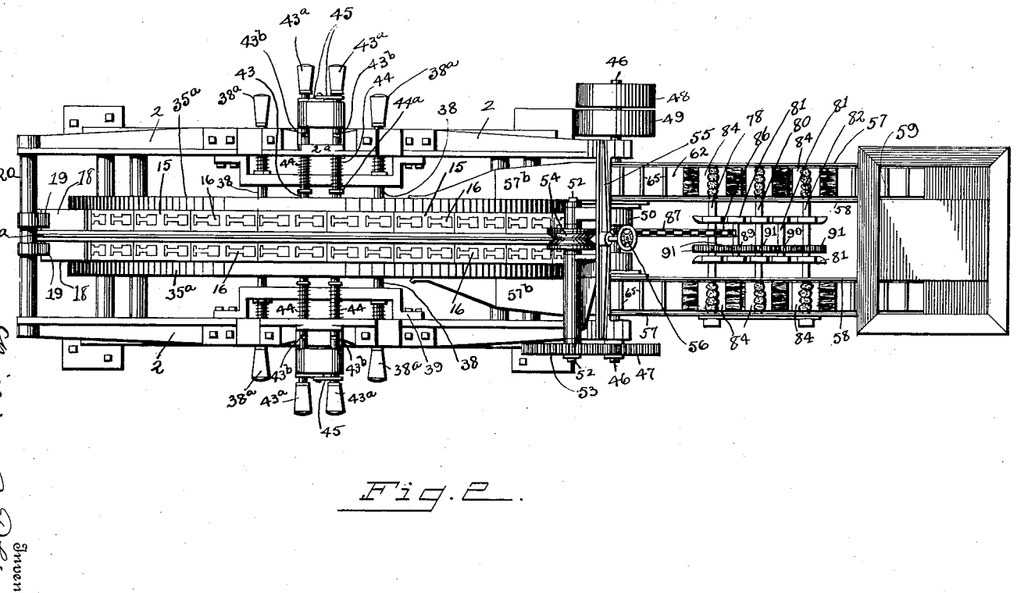
Fig. 2 is a plan view of the same.

To the outer side of each of the frame members 1ª and on the inner side of each handle extension 38ª of the rods 38, I pivot as indicated at 41 a swinging dog 42, the free end of which is adapted to bear upon the upper side of the outwardly projecting portion of the adjacent rod 38 and when said rods are pulled to their outer limit and the cutting blades thus pulled outward from their supporting recesses, these dogs engage upper side notches in said rods 38, such as appear in Fig. 2 of the drawing, in similar spring actuated cutter blade carrying rods supported in the upper portion of the machine in the manner and for the purpose about to be described. In each of the recesses 10 which are formed between the band 6 and the inner ends of the segments 9 and ribs 11 and in the upper portion of said recess is removably inserted a cutter blade 37, corresponding in form as heretofore stated, with the cutter blade 36 shown in Fig. 9. With the outer edge of each of these upper cutter blades 37 are connected two outwardly extending rods 43, which pass through the frame extensions 2ª and carry on their outer ends suitable handles or heads 43ª. The rods 43 as prescribed for the rods 38 are spring actuated and are normally pressed inward by springs 44 carried between the frame extension 2ª and collars 44ª on the rods. As prescribed for the rods 38, the rods 43 have formed in their upper sides, notches 43ᵇ which when said rods are pulled to their outer limit, are engaged by the free ends of dogs 45 which are pivoted to the frame between the rods.

Before describing the operation of the mechanism described, I will proceed to describe the construction and operation of the means for imparting rotary motion to the pocket and cup carrying disk and the means for feeding the beans to be operated upon into said cups and pockets.

Rotatably mounted between the outer ends of two of the frame members 2, is a shaft 46 upon one end of which is carried a gear wheel 47 and upon the remaining end of which are carried the usual tight and loose pulleys 48 and 49. Swinging from the central portion of the shaft 46 are the arms of a bifurcated bracket 50, the outer end of said bracket being connected with a horizontal shaft sleeve 51 in which is journaled a shaft 52, the latter carrying on its outer end a gear wheel 53 which meshes with the gear wheel 47. The shaft 52 also carries a friction driving wheel 54, the peripheral groove of which as adapted to receive or engage the substantially V-shaped track rim 5ª of the disk 5. Bridging the frame arms 2 on that side of the machine on which is carried the shaft 46 is a bar 55, which bar is formed with a central threaded opening through which passes the threaded stem of a pressure screw 56, the inner end of the latter adapted to bear against the bracket 50 and thereby produce the desired pressure or frictional engagement of the wheel 54 and track rim 5ª.

As shown in the drawing, (see Fig. 5) the shaft 46 passes transversely through the upper end of an elevator casing 57, this casing inclining from a point above the center of the height of the disk 5 to the supporting floor of the frame standards 1. The casing 57 is separated into two outer side parallel elevator channels 57ª, through the medium of parallel partition plates 58 and in the lower portion of the casing 57 is provided an upright hopper 59, the lower portion of which opens into both of said channels or compartments 57ª. In its upper end portion each of the channels 57ª is provided with a downwardly and forwardly inclined continuation, these channel continuations being formed by casing arms 57ᶜ which embrace opposite sides of the machine body heretofore described. As shown more clearly in Figs. 5, 5ᴬ and 2, the inner faces of the channel arms 57ᶜ are in close proximity to the outer mouth edges of the cups 35 and the outer faces of said channel arms have their lower portions inclined inward toward said cups, forming the bevel terminations indicated more clearly in Fig. 5A. The inner face of each of the members 57c is formed with an opening in its lower portion, which is indicated at 60, thus providing a means of communication between the lower portions of said channel arms and the mouths of the cups 35.

Figures 5, 5A:
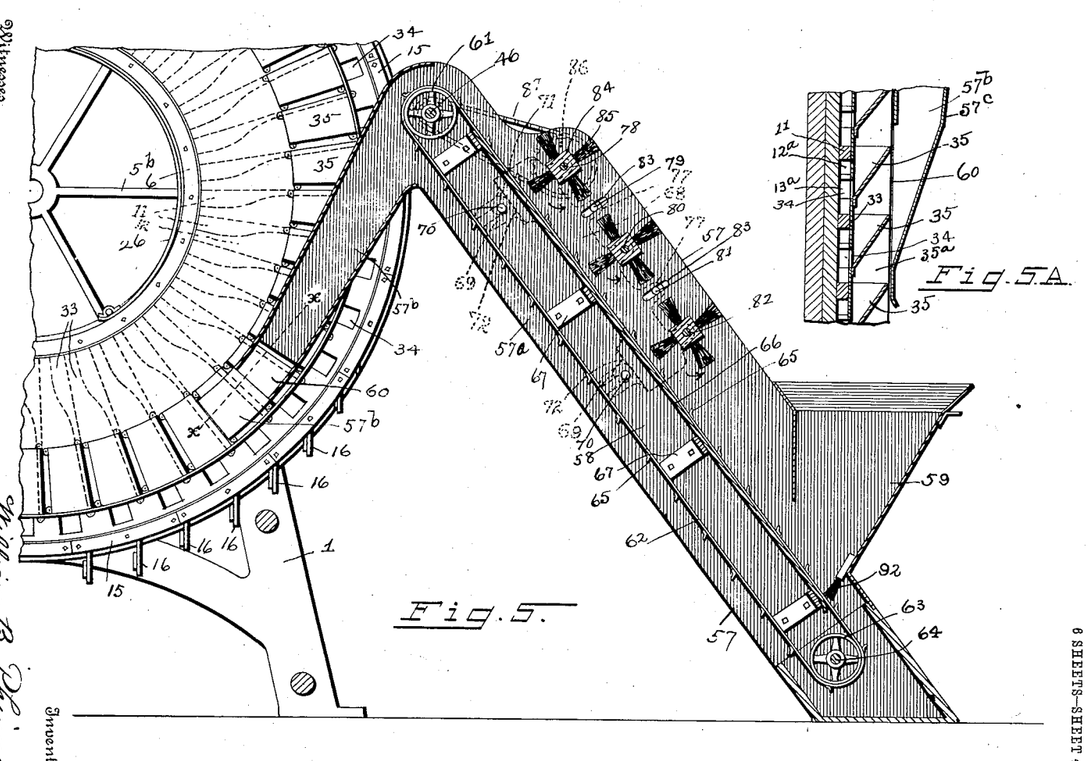

As shown in the drawing, the shaft 46 passes transversely through the upper portion of the casing body 57 and on this shaft, as shown in Fig. 5, is carried in each of the channels 57a a belt or pulley wheel 61 over which runs an endless belt 62, the lower end of which passes over a similar belt or pulley wheel 63 carried on a shaft 64 journaled transversely in the lower end portion of the casing 57 below the hopper 59. Each of these endless belts 62 is provided on its outer surface at regular intervals with angular carrier projections 65 and the outer member of each of the belts 62 runs on the outer side of a plate 66 which extends in the direction of the length of the casing 57 and which is supported by brackets 67 which project from one of the partition walls 58. Between the partition walls 58 of the double conveyer, I provide two parallel and separated bearing plates 68 which are arranged in the upper half of the conveyer frame, each of these bearing plates being provided on its lower or inner edge with a recessed or bifurcated extension 69 and these bifurcated extensions straddle transverse shafts 70 which are journaled in the outer side walls of the elevator frame 57. On the inner side of each of the bifurcated extensions 69, each of the rods 70 has eccentrically mounted thereon a cam body 71, as shown in dotted lines in Fig. 5 of the drawing and these cams are adapted to have their upper sides bear against inner side shoulders 72 on the plates 68. The corresponding outer ends of the shafts 70 which extend through one of the side walls of the elevator frame 57 have connected therewith, as shown more clearly in Fig. 1 of the drawing, handle members 73 and through a pin opening in each of these handles, passes a removable pin 74, the inner end of which is adapted to be inserted into the desired one of a number of pin holes 75 formed on a segment bar 76 secured to the outer face of the frame 57. The outer edge of each of the bearing plates 68 has projecting therefrom, a plurality of ears 77, in which are journaled respectively transverse shafts 78, 79, 80, 81 and 82, the shafts 78, 80 and 82 passing through slotted openings in the walls 58 such as are shown at 83 between said shafts in Fig. 5 of the drawing. Upon each of said shafts 78, 80 and 82 is mounted in each of the channels 57a of the elevator, a brush carrying block 84, the brush bristles of which are indicated at 85 and which are adapted to extend to within close proximity to the carrying projections 65 of the belt 62. Upon the central portion of the shaft 78 is carried a sprocket wheel 86, over which a chain belt 87 runs from a sprocket wheel 88 which is carried on the shaft 46. The shafts 79 and 81 are comparatively short shafts and carry as shown more clearly in Figs. 2 and 3, gear wheels 89 and 90, which gear with similar wheels 91 which are carried on the longer brush carrying shafts 78, 80 and 82.

At the junction of the lower portion of each passage of the hopper 59 with the downwardly extending portion of the frame 57, I provide a fixed brush 92, the bristles of which extend to the belt 62 and cut off communication with the lower portion of the frame 57 below the hopper and above the carrier belt.

In operating my machine, it will be understood that rotary motion will be imparted to the wheel-like body or casing which comprises the central disk 5 and attached parts and which will be hereinafter referred to as the snipping drum, in the following manner. A belt from the wheel of a motor or other power device, running over the wheel 49 of the shaft 46, imparts rotary motion to said shaft and gear wheel 47 and this motion is communicated through the gear wheel 53 to the shaft 52 which imparts rotary motion to the grooved wheel 54 which through frictional contact with the track 5a of the snipping drum, serves to rotate the latter. In this connection, it will be understood that the pressure of the grooved wheel 54 upon said track 5a, is regulated by turning the hand operated pressure screw 56 until the inner end of the latter through pressure upon the bracket 50, produces the proper bearing of said wheel 54 against its track surface. Through the sprocket chain 87, motion is contributed from the shaft 46 to the shaft 78 and from the latter to the shafts 79, 80, 81 and 82 through the gear wheels 91, thereby producing a rotation of the brush blocks. The parts being thus set in motion, the beans to be treated are fed into the hopper 59 and the beans from said hopper are distributed into the parallel elevator channels 57a where they are caught by the carrier projections 65 of the belts 62 and carried upward to the upper end of the elevator and over the wheels 61, at which point the beans are dropped into the chutes or arms 57b.

In order to regulate the quantity of beans carried over the wheel 61, I have provided the brushes which rotate in the directions of the arrows indicated in Fig. 5, these brushes by contact with the beans carried by the belt 62, serve by their backward movement to prevent an undesirable quantity of the beans reaching the upper end of the conveyer. It will be understood that by turning the cam shafts 70 and setting the handles 73 thereof, at different positions with relation to the perforated segments 76, the bearing plates 68 may be forced outward or inward by pressure of the cams 71 to regulate the distances between the belt 62 and the brush tips. As will readily be understood, the beans which pass downward through the channel arms 57ᵇ will be discharged through the openings 60 into the mouths of the cups 35 as the latter move past said openings. In this manner the beans will be distributed in desirable quantities into the various cups as the latter travel upward and in order to clearly understand the operation of my device, I will follow the course of one of the bean pods from the cup 35 to its point of discharge. From a cup 35, the bean pod passes through the opening 34 into the corresponding pocket 12, where it is dropped lengthwise downward into the inner end of the pocket, the end of the bean pod entering the corresponding opening 7 in the band 6 and contacting with the inner face of the closure plate 8. In this position the bean is carried by the rotation of the snipper drum, until by contact with the sharpened and inclined end of the cutter blade 37, the tip end of the pod is cut off. The end of the pod thus operated upon, is thereafter carried upon the upper surface of the cutter blade 37 until it has passed said blade, when it will be permitted to drop inward against the face of one of the closure plates 8 which is held closed by the strip 30. It will be observed, however, that by the arrangement of parts shown in the drawing, the closure plate which carries the severed tip of the bean, will pass out of contact with the upper end of the cam regulated strip 26, permitting said closure plate to open in the manner shown in Fig. 6.of the drawing, and allowing the severed tip to be discharged from the opening 7. Before the pod which has been operated upon, passes out of contact with the knife blade, however, the open closure plate comes into engagement with the substantially horizontal extension 30ᵃ of the strip 30 and riding upon the same is eventually closed by the latter. The pod is carried as described, until through the rotation of the snipper drum, the tendency of the pod will be to drop downward or outward toward the outer end of the pocket 12 and following the lower side of said pocket through gravity, the pod will be directed lengthwise into the pocket passage 12ᵃ where its unsevered tip will bear upon the inner face of one of the closure plates 16 (see Fig. 7) until by contact with the sharpened end of the cutter blade 36, the remaining end of the bean pod will be snipped or cut off, after which the pod will ride upon the cutter blade until out of contact with the opposite end thereof, when it will be permitted to drop outward and downward through one of the openings 17. It will be understood that the closure plates 16 will be retained in closed positions until they pass out of contact with the strip 18, at which time said closure plates will drop downward to the positions shown in Fig. 7 and permit the discharge of the severed pod tip. It is obvious that the lengths of the pod tips or ends which are severed, may be regulated by turning the handle members 29 and 23 to produce the desired degree of upward pressure of the cams 27 and 21 against the strips 26 and 18, said strips thereby regulating the degree of inward or closing movements of the closure plates and thereby regulating the distances between said closure plates and the cutter blade channels or recesses. By this operation, it will readily be understood that the beans are fed into the various pockets, carried to the inner ends of said pockets where the tips are removed from the lower ends thereof, after which they are carried to the opposite ends of the pockets, the outer tips removed and the beans discharged from the machine, thus providing for the automatic removal of the flower and stem ends of the bean or its pod. In case, however, a bean pod of crooked or irregular form is prevented by reason of its shape, from entering the reduced inner end portion of one of the pockets, it is obvious that such bean will be afterward thrown to the outer end of the pocket and that it may find a passage out through the inclined channel 13ᵃ and the uncovered extension of the corresponding opening 34, thus providing a means for the discharge of beans which owing to their forms, would only serve to clog the pockets.

Owing to the fact that the cutter blades are spring actuated as described and that the cutting end of each of the blades, is inclined, it will be understood that in case a nail, piece of wire or other foreign article should in any manner be contained among the beans to be operated upon, the contact of such unyielding foreign body with the end of one of the cutter blades, will tend to press the cutter blade outward and permit the dropping of the foreign body through one of the openings 17, the springs 40 serving to automatically return the cutter blade to its normal position.

It will be observed that by the provision of a double channeled elevator, and duplicate bean carrying and snipping devices, a comparatively large quantity of beans may be snipped or severed at their ends, in a short space of time and that the means by which I accomplish the objects of my invention are comparatively simple and the construction of the device such as to obviate a tendency of the same toward becoming inoperative.

What I claim, is:

1. In a bean snipper, the combination with a rotatable drum comprising internal radial pockets having end openings, and means for automatically opening and closing said pocket openings, of a circular row of radially arranged open-mouthed cups on said drum, said cups communicating respectively with said pockets and cutting devices arranged adjacent to both ends of said pockets.

2. In a bean snipper, the combination with a rotatable drum comprising internal radial pockets, of spring actuated cutter blades arranged adjacent to both ends of the pockets, and means for feeding string-beans into said pockets.

3. In a bean snipper, the combination with a rotatable drum comprising internal radially arranged pockets, said pockets having comparatively narrow end openings, and inclined guide blocks in their outer ends, of cutter blades arranged in shearing engagement with the ends of the pockets, each of said pockets having an outside opening for the reception of beans, the inclined surfaces of said outer end blocks leading to said outer side openings.

4. In a bean snipper, the combination with a rotatable drum comprising internal radially arranged pockets having openings in their ends, of pivoted closure plates, and means for automatically opening and closing said plates at predetermined periods, and means for feeding string-beans into said pockets while said drum is in motion.

5. In a bean snipper, the combination with a rotatable drum comprising internal radial pockets having openings at each end, said pockets being formed of reduced width toward their inner ends, of cutting members supported in shearing relations to the end openings of said pockets, and means for feeding string-beans laterally into said pockets.

6. In a bean snipper, the combination with a rotatable drum comprising a plurality of internal radial pockets having end openings, cutter blades supported in shearing relation to said pocket openings, and means for automatically opening and closing said pocket openings at desirable periods, of cups radially arranged on the outer side of said drum and having open mouths, said cups communicating with said pockets, and a feeding mechanism comprising a fixed conveyer arm having an inner side opening arranged in shearing relation to the lip members of said cups.

7. In a bean snipper, the combination with a rotatable drum having a circular row of open-mouth cups projecting laterally therefrom and communicating therewith, and means for severing the ends from bean pods discharged into said drum through said cups, of an elevating mechanism comprising an inclined elevator frame, an endless carrier belt mounted therein, brushes rotatably mounted on the outer side of said belt, and a hollow discharging arm leading from said conveyer to a point adjacent to the line of travel of the open mouths of said cups, and means for imparting rotary motion to said drum and brushes and a traveling motion to said carrier belt.

8. In a bean snipper, the combination with a rotatably mounted drum comprising a central disk and compartments on opposite sides of said disk, and means for engaging and severing the ends of bean pods discharged into said compartments, of a conveyer comprising an inclined conveyer frame having parallel separated conveyer channels, hollow discharge arms leading from said conveyer channels to points adjacent to openings in the drum compartments, and means contained in said conveyer channels for elevating bean pods therein and discharging the same through said hollow arms.

9. In a bean snipper, the combination with a rotatable drum comprising a central rotatably mounted disk, a casing on each side of said disk, a series of radially arranged open end pockets in each of said casings, and cutting means supported adjacent to the pocket ends, of a circular row of laterally projecting open-mouthed radially arranged cups on each side of said drum, and means for simultaneously feeding bean pods into the cups at both sides of the drum.

10. In a bean snipper, the combination of a rotatable drum having a plurality of radial pockets, movable closures for opposite ends of each pocket, cutters arranged adjacent to the ends of the pockets and adapted to snip off the ends of the beans arranged therein and resting against said closures, and means for controlling the movement of said closures.

11. In a bean snipper, the combination of a rotatable drum having a plurality of radial pockets, movable closures for opposite ends of each pocket, cutters arranged adjacent to the ends of the pockets and adapted to snip off the ends of the beans arranged therein and resting against said closures, and means for controlling the movement of said closures comprising curved strips with which said closures engage.

12. In a bean snipper, the combination of a rotatable drum having a plurality of radial pockets, movable closures for opposite ends of each pocket, cutters arranged adjacent to the ends of the pockets and adapted to snip off the ends of the beans arranged therein and resting against said closures, and means for controlling the movement of said closures comprising curved strips with which said closures engage, a fixed support for one end of each of said strips, and rotatable cams mounted on a fixed support and each engaging with the other end of one of said strips.

In testimony whereof I affix my signature in presence of two witnesses.

WILLIAM B. PHINNEY.

Witnesses:
L. CARL STOUGHTON,
A. L. PHELPS.